(12) United States Patent
Li et al.

(10) Patent No.: US 10,405,250 B2
(45) Date of Patent: Sep. 3, 2019

(54) RRM MEASUREMENT METHOD, MEASUREMENT SYSTEM, TERMINAL AND BASE STATION

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yi-Xue Lei, Shenzhen (CN); Yun-Fei Zhang, Shenzhen (CN)

(73) Assignee: YULONG COMPUTER TELECOMMUNICATION SCIENTIFIC (SHENZHEN) CO., LTD., Shenzhen (CN)

(*) Notice: Subject to any disclaimer, the term of this patent is extended or adjusted under 35 U.S.C. 154(b) by 206 days.

(21) Appl. No.: 15/497,212

(22) Filed: Apr. 26, 2017

(65) Prior Publication Data

US 2017/0230874 A1 Aug. 10, 2017

Related U.S. Application Data

(63) Continuation of application No. PCT/CN2015/077986, filed on Apr. 30, 2015.

(30) Foreign Application Priority Data

Dec. 19, 2014 (CN) .......................... 2014 1 0805888

(51) Int. Cl.
*H04B 17/318* (2015.01)
*H04L 5/00* (2006.01)
(Continued)

(52) U.S. Cl.
CPC ...... *H04W 36/0094* (2013.01); *H04B 17/318* (2015.01); *H04L 5/0048* (2013.01);
(Continued)

(58) Field of Classification Search
CPC ........................... H04W 24/10; H04W 72/044
(Continued)

(56) References Cited

U.S. PATENT DOCUMENTS

2013/0225188 A1 8/2013 Seo et al.
2013/0322279 A1* 12/2013 Chincholi ............. H04W 24/10
370/252
(Continued)

FOREIGN PATENT DOCUMENTS

WO 2004100468 A1 11/2004
WO 2013112983 A2 8/2013

OTHER PUBLICATIONS

NTT Docomo,Views on PHY layer options for LAA DL,R1-145107,3GPP TSG RAN WG1 Meeting #79,San Francisco, USA, Nov. 17-21, 2014.

*Primary Examiner* — Iqbal Zaidi
(74) *Attorney, Agent, or Firm* — ScienBiziP, P.C.

(57) ABSTRACT

An RRM measuring method of an LTE system in an unlicensed frequency band, a system, a terminal and a base station are provided. The method includes: receiving a downlink signal sent by each base station in at least one base station to determine a busy/idle status of an uplink channel and/or a downlink channel of each base station; calculating a value of RSRQ of each base station, when the uplink channel and/or the downlink channel of each base station is in a busy state or in an idle state; reporting the values of RSRQ to a service base station. The present disclosure measures the values of RSRQ according to the channel statuses of the base station, thus the serving base station (Continued)

determines the service performance of a neighboring base station to select a more appropriate auxiliary cell base station or a target base station when switching.

17 Claims, 8 Drawing Sheets

(51) Int. Cl.
*H04W 24/10* (2009.01)
*H04W 48/16* (2009.01)
*H04W 36/08* (2009.01)
*H04W 36/30* (2009.01)
*H04W 36/00* (2009.01)
*H04W 24/08* (2009.01)
*H04W 74/08* (2009.01)
*H04W 88/08* (2009.01)

(52) U.S. Cl.
CPC ........... *H04W 24/08* (2013.01); *H04W 24/10* (2013.01); *H04W 36/08* (2013.01); *H04W 36/30* (2013.01); *H04W 48/16* (2013.01); *H04W 36/0085* (2018.08); *H04W 74/0808* (2013.01); *H04W 88/08* (2013.01)

(58) Field of Classification Search
USPC .................................................. 370/252–339
See application file for complete search history.

(56) References Cited

U.S. PATENT DOCUMENTS

2014/0036805 A1    2/2014  Sadek et al.
2016/0234706 A1*   8/2016  Liu ....................... H04L 5/0048
2017/0202043 A1*   7/2017  Seo ......................... H04W 4/70

* cited by examiner

RRM MEASUREMENT METHOD, MEASUREMENT SYSTEM, TERMINAL AND BASE STATION

The application claims the benefit of a Chinese patent application filed on Dec. 19, 2014, No. CN201410805888.6, and called "RRM measurement method and measurement system, terminal and base station", the contents of which are all incorporated by reference.

FIELD

The present disclosure relates to communication technique, in particular to an RRM measurement method of an LTE system working in an unlicensed frequency band, an RRM measurement system of an LTE system working in an unlicensed frequency band, a terminal, and a base station.

BACKGROUND

As the amount of communication traffic increases, the authorized spectrum of a 3GPP becomes insufficient to provide higher network capacity. In order to further improve the utilization rate of frequency spectrum resources, the 3GPP is discussing that how unlicensed spectrums can be used with the help of the authorized spectrum, such as 2.4 GHz and 5 GHz frequency bands. The unlicensed spectrums are mainly used in systems such as WI-FI, BLUETOOTH, radar, medical care uses, and the like.

In general, access technologies, designed for an authorized frequency range, such as Long Term Evolution (LTE), are not applicable to use in unlicensed frequency ranges. Access technologies, such as LTE, have very high requirements for spectrum efficiency and user experience optimization. However, a Carrier Aggregation (CA) function enables the LTE to be deployed in an unlicensed frequency range. The 3GPP provides a concept of LTE Assisted Access (LAA), which can use the unlicensed spectrum with the help of LTE authorized spectrums. The unauthorized frequency spectrum can have two working modes. One working mode is a Supplemental Downlink (SDL), that is, only a downlink transmission subframe is included. The other working mode is a Time Division Duplexing (TDD) mode, that is, both the downlink subframe and an uplink subframe are included. The SDL can only be used by means of CA. However, the TDD mode can be used not only by means of the CA technology, but also by Dual Connectivity (DC), and can also be used independently.

Compared with a WI-FI system, the LTE system in the unauthorized frequency range can provide higher spectrum efficiency and larger coverage. Data traffic can be seamlessly switched between the authorized frequency range and the unauthorized frequency range based on the same core network. For users, this means a better broadband experience, a higher speed, a better stability, and more mobility.

Existing access technologies on an unlicensed spectrum, such as WI-FI, have a weak anti-interference capability. In order to avoid interference, the WI-FI system is designed with many interference avoidance rules, such as Carrier Sense Multiple Access/Collision Detection (CSMA/CD) method. The basic principle of the CSMA/CD method is to monitor whether there are other access points (APs) or terminals on the periphery sending/receiving signaling or data before an AP of WI-FI or a terminal sends signaling or data. If there are other APs or terminals on the periphery are sending/receiving signaling or data, monitoring is continued until no sending/receiving of the signaling or data. Otherwise, if there are no other APs or terminals on the periphery which are sending/receiving signaling or data, a random number is generated as a waiting time. In the waiting time, if no signaling or data transmission is detected, the AP or the terminal may begin sending signaling or data after the waiting time is completed. The process is shown as in FIG. 1.

Good orthogonality in the LTE network means there is no need to consider whether or not there are other base stations or other users around which are transmitting data, in the base station and the uplink and downlink transmissions of the user. If the LTE is used in the unlicensed frequency band, there is no need to consider whether or not other devices are using the unlicensed frequency band. In such a situation, WI-FI equipment is subjected to great interference. As long as there is a service, the WI-FI device will transmit data. No monitoring rule exists. An idle state of the channel can be detected only after the transmission of the LTE service is completed. After that, data transmission can be carried out.

Therefore, when the LTE network uses the unlicensed frequency band, one of the most key points is to ensure that the LAA can coexist with the existing access technologies (such as WI-FI) on a fair-friendly basis. However, there is no Listen Before Talk (LBT) mechanism to avoid collisions in the conventional LTE system.

Specifically, as shown in FIG. 2, it is assumed that a repetition period of the LBT detection is 10 milliseconds (ms), and an LBT occupancy duration is 1 ms, that is, one sub-frame. If a channel idle state is detected within the first LBT period shown in FIG. 2, this indicates that the surrounding interference is small. Then, other sub-frames in this period can be occupied. If a channel busy state is detected within the second LBT period, this indicates that the surrounding interference is heavy. Then, other sub-frames cannot be occupied in the period.

In this case, measurements of Radio Resource Management (RRM), how to measure a reference signal reception power (RSRP) and the reference signal reception quality (RSRQ) for example is problematic.

SUMMARY OF THE INVENTION

Based on at least one of the above technical problems, the present disclosure provides a novel RRM measurement scheme of an LTE system working in an unlicensed frequency band. The RRM measurement scheme can measure a value of RSRP and of RSRQ for the channel of a base station. Thus, a service base station of the terminal can accurately determine a service performance of adjacent base stations, to select a more suitable secondary cell base station, or select a more suitable target base station when switching.

According to a first aspect of the present disclosure, an RRM measurement method of a LTE system working in the unlicensed frequency band is provided. The RRM measurement method is applicable to a terminal and includes: receiving a downlink signal sent by each base station in at least one base station, and determining a busy/idle state of an uplink channel and/or a downlink channel of each base station according to the downlink signal; calculating a value of RSRQ corresponding to each base station respectively, when the uplink channel and/or the downlink channel of each base station is in a busy state and in an idle state; reporting the value of the RSRQ when the uplink channel and/or the downlink channel of each base station is in a busy state and the value of the RSRQ when the uplink channel and/or the downlink channel of each base station is in an idle state, to a service base station of the terminal.

In the above disclosure, surrounding interference signal needs to be considered when determining the RSRQ. Thus, the busy/idle state of the uplink channel and/or the downlink channel of each base station is determined according to the downlink signals sent by each base station, so as to calculate the value of the RSRQ in the uplink channel and/or the downlink channel of each base station in the busy state and the value of the RSRQ in the uplink channel and/or the downlink channel of each base station in the idle state respectively. Thus, the values of the RSRQ in the uplink channel and/or the downlink channel of the base station can be measured respectively when the uplink channel and/or the downlink channel of the base station are in different states. That is, the values of the RSRQ can be measured respectively when the surrounding interference is weak (the channel is idle) and when the surrounding interference is strong (the channel is busy). Thus, the service base station can be ensured to select a more appropriate secondary cell base station or select a more appropriate target base station when switching.

The above disclosure, preferably, further includes: calculating a busy/idle ratio of the uplink channel and/or the downlink channel of each base station, and reporting the busy/idle ratio of the uplink channel and/or the downlink channel of each base station to the service base station.

In the above disclosure, the busy/idle ratio of the uplink channel and/or the downlink channel of each base station is reported to the service base station, so that the service base station can determine a service performance of each base station according to the busy/idle ratio of the uplink channel and/or the downlink channel of each base station; and the service base station can determine the service performance of each base station according to the busy/idle ratio of the uplink channel and/or the downlink channel of each base station. A more suitable secondary cell base station can be selected or a more appropriate target base station can be selected when switching.

The above disclosure, preferably, further includes: measuring a value of RSRP corresponding to each base station, when the uplink channel and/or the downlink channel of each base station is in a busy state and/or in an idle state; and reporting the value of the RSRP corresponding to each base station to the service base station.

In the above disclosure, since the value of the RSRP is not affected by the surrounding interference signal, the measurement can be performed when the uplink channel and/or the downlink channel is in a busy state, and the measurement may also be performed when the uplink channel and/or the downlink channel is in an idle state.

Schemes of determining the busy/idle state of the uplink channel and/or the downlink channel of the base station by the terminal may include:

Scheme 1 is described below.

In the above disclosure, preferably, determining the busy/idle state of the uplink channel and/or the downlink channel of each base station according to the downlink signal includes: detecting a period of sending a reference signal by each base station; determining that the uplink channel and/or the downlink channel of any base station is in a busy state, when the period of sending the reference signal by any base station in the at least one base station is greater than or equal to a predetermined period; and determining that the uplink channel and/or the downlink channel of any base station is in an idle state, when the period of sending the reference signal by any base station in the at least one base station is less than the predetermined period.

In the above disclosure, the base station may set the period of sending the reference signal after the state of the uplink channel and/or the downlink channel is determined. Specifically, if the uplink channel and/or the downlink channel of the base station is in a busy state, the period of the reference signal is longer; and if the uplink channel and/or the downlink channel of the base station is in an idle state, the period of the reference signal is shorter. Thus, the terminal can determine the busy/idle state of the uplink channel and/or the downlink channel according to the period of sending the reference signal.

Scheme 2 is described below.

In the above disclosure, preferably, determining the busy/idle state of the uplink channel and/or the downlink channel of each base station according to the downlink signal includes: determining that the uplink channel and/or the downlink channel of any base station is in an idle state, when a resource reservation signal sent by any base station in the at least one base station or a signal indicating that the uplink channel and/or the downlink channel of any base station is in an idle state is received.

In the above disclosure, the base station may explicitly notify the terminal as to the state of the uplink and/or downlink channels of the base station.

Scheme 3 is described below.

In the above disclosure, preferably, determining the busy/idle state of the uplink channel and/or the downlink channel of each base station according to the downlink signal includes: determining that the uplink channel and/or the downlink channel of each base station is in a busy state, when receiving an instruction indicating that the micro cell base station is closed by any base station in the at least one base station. Specifically, if the terminal receives the instruction indicating that the micro cell base station is closed by a base station, the terminal can determine directly that the channel of the base station is in a busy state.

According to a second aspect of the present disclosure, an RRM measurement method of an LTE system working in the unlicensed frequency band is provided. The RRM measurement method is applicable to a base station, and includes: receiving a value of RSRQ corresponding to each base station in at least one base station, obtained when an uplink channel and/or a downlink channel of each base station is in a busy state, and a value of the RSRQ corresponding to each base station in at least one base station, obtained when the uplink channel and/or the downlink channel of each base station is in an idle state, reported by a terminal; and determining a service performance of each base station according to the value of the RSRQ obtained when uplink channel and/or downlink channel of each base station is in a busy state and the value of the RSRQ obtained when the uplink channel and/or the downlink channel of each base station is in an idle state.

In the above disclosure, surrounding interference signal needs to be considered when determining the RSRQ. Therefore, a service performance of each base station can be determined accurately (by the service base station of the terminal), according to the values of the RSRQ corresponding to each base station in at least one base station when the uplink channel and/or the downlink channel of each base station is in a busy state and in an idle state reported by the terminal. Thus, the service base station can be ensured to select a more appropriate secondary cell base station or select a more appropriate target base station when switching.

The above disclosure, preferably, further includes: receiving a busy/idle ratio of the uplink channel and/or the downlink channel of each base station reported by the terminal, and/or a busy/idle ratio of the uplink channel and/or the downlink channel of other base stations reported by the other base stations; determining a service performance of each base station and/or the other base station, according to the busy/idle ratio of the uplink channel and/or the downlink channel of each base station and/or the busy/idle ratio of the uplink channel and/or the downlink channel of the other base stations.

In the above disclosure, by receiving the busy/idle ratio of the uplink channel and/or the downlink channel of each base station reported by the terminal, the service base station can determine the service performance of each base station according to the busy/idle ratio of the uplink channel and/or the downlink channel of each base station. The service base station, thus, can select a more appropriate secondary cell base station or select a more appropriate target base station when switching.

The above disclosure, preferably, further includes: determining whether there is a need to switch to a target base station to provide services to the terminal according to the service performance of the target base station, selecting the target base station according to the service performance of the at least one base station when it is determined to switch to the target base station to provide services to the terminal; and/or selecting the target base station serving as an auxiliary cell base station according to the service performance of the at least one base station.

In the above disclosure, preferably, selecting the target base station includes any one or more of the following combinations: selecting the base station which has the maximum RSRQ obtained when the uplink channel and/or the downlink channel is in a busy state as the target base station; selecting the base station which has the maximum RSRQ value obtained when the uplink channel and/or the downlink channel is in an idle state as the target base station, and selecting the base station which has the maximum busy/idle ratio of the uplink channel and/or the downlink channel as the target base station.

The above disclosure, preferably, further includes: indicating the terminal to measure the RSRQ at a designated time-frequency location.

According to a third aspect of the present disclosure, an RRM measuring system of a LTE system working in the unlicensed frequency band is provided. The RRM measurement system is applicable to a terminal and includes: a receiving unit, which is configured to receive a downlink signal sent by each base station in at least one base station; a determination unit, which is configured to determine a busy/idle state of an uplink channel and/or a downlink channel of each base station according to the downlink signal; a statistics unit, which is configured to calculate a value of RSRQ corresponding to each base station respectively, when the uplink channel and/or the downlink channel of each base station is in a busy state and in an idle state; and a transmission unit, which is configured to report the value of the RSRQ when the uplink channel and/or the downlink channel of each base station is in a busy state and the value of the RSRQ when the uplink channel and/or the downlink channel of each base station is in an idle state to a service base station of the terminal.

In the above disclosure, surrounding interference signal needs to be considered when determining the RSRQ. Thus, the busy/idle state of the uplink channel and/or the downlink channel of each base station is determined according to the downlink signals sent by each base station, so as to calculate the value of the RSRQ in the uplink channel and/or the downlink channel of each base station in the busy state and the value of the RSRQ in the uplink channel and/or the downlink channel of each base station in the idle state respectively. Thus, the values of the RSRQ in the uplink channel and/or the downlink channel of the base station can be measured respectively when the uplink channel and/or the downlink channel of the base station are in different states. That is, the values of the RSRQ can be measured respectively when the surrounding interference is weak (the channel is idle) and when the surrounding interference is strong (the channel is busy). Thus, the service base station can be ensured to select a more appropriate secondary cell base station or select a more appropriate target base station when switching.

The above disclosure, preferably, further includes a calculation unit, which is configured to calculate a busy/idle ratio of the uplink channel and/or the downlink channel of each base station; and the transmission unit is further configured to report the busy/idle ratio of the uplink channel and/or the downlink channel of each base station to the service base station.

In the above disclosure, the busy/idle ratio of the uplink channel and/or the downlink channel of each base station is reported to the service base station, so that the service base station can determine a service performance of each base station according to the busy/idle ratio of the uplink channel and/or the downlink channel of each base station; and the service base station can determine the service performance of each base station according to the busy/idle ratio of the uplink channel and/or the downlink channel of each base station. A more suitable secondary cell base station can be selected or a more appropriate target base station can be selected when switching.

The above disclosure, preferably, further includes: a measurement unit, which is configured to measure a value of RSRP corresponding to each base station, when the uplink channel and/or the downlink channel of each base station is in a busy state and/or in an idle state; and the transmission unit is further configured to report the value of the RSRP corresponding to each base station to the service base station.

In the above disclosure, since the value of the RSRP is not affected by the surrounding interference signal, the measurement can be performed when the uplink channel and/or the downlink channel is in a busy state, and the measurement may also be performed when the uplink channel and/or the downlink channel is in an idle state.

Schemes of determining the busy/idle state of the uplink channel and/or the downlink channel of the base station by the terminal may include:

Scheme 1 is described below.

In the above disclosure, preferably, the determination unit includes: a detection unit configured to detect a period of sending a reference signal by each base station; an execution unit configured to determine that the uplink channel and/or the downlink channel of any base station is in a busy state, when the period of sending the reference signal by any base station in the at least one base station is greater than or equal to a predetermined period, and determine that the uplink channel and/or the downlink channel of any base station is in an idle state, when the period of sending the reference signal by any base station in the at least one base station is less than the predetermined period.

In the above disclosure, the base station may set the period of sending the reference signal after the state of the uplink channel and/or the downlink channel is determined. Specifically, if the uplink channel and/or the downlink channel of the base station is in a busy state, the period of the reference signal is longer; and if the uplink channel and/or the downlink channel of the base station is in an idle state, the period of the reference signal is shorter. Thus, the terminal can determine the busy/idle state of the uplink channel and/or the downlink channel according to the period of sending the reference signal.

Scheme 2 is described below.

In the above disclosure, preferably, the determination unit is specifically configured to determine that the uplink channel and/or the downlink channel of any base station is in an idle state, when a resource reservation signal sent by any base station in the at least one base station or a signal indicating that the uplink channel and/or the downlink channel of any base station is in an idle state is received.

In the above disclosure, the base station may explicitly notify the terminal the state of the uplink and/or downlink channels of the base station.

Scheme 3 is described below.

In the above disclosure, preferably, the determination unit is specifically configured to determine that the uplink channel and/or the downlink channel of each base station is in a busy state, when receiving an instruction indicating that the micro cell base station is closed by any base station in the at least one base station. Specifically, if the terminal receives the instruction indicating that the micro cell base station is closed by any base station, the terminal can determine directly that the channels of the base station in a busy state.

According to a fourth aspect of the present disclosure, a terminal is provided. The terminal includes a communication bus, an input device, an output device, a memory and a processor.

The communication bus is used for realizing connection communication among the input device, the output device, the memory and the processor; wherein:

the input device is used for receiving a downlink signal;

the output device is used for reporting a value of RSRQ obtained when an uplink channel and/or a downlink channel of each base station is in a busy state and a value of the RSRQ obtained when the uplink channel and/or the downlink channel of each base station is in an idle state;

the memory stores a set of program codes, and the processor retrieves the program codes stored in the memory and executes the following operations:

receiving, by the input device, a downlink signal sent by each base station in at least one base station, and determining busy/idle states of an uplink channel and/or a downlink channel of each base station according to the downlink signal;

calculating a value of RSRQ corresponding to each base station respectively, when the uplink channel and/or the downlink channel of each base station is in a busy state and in an idle state;

reporting, by the output device, the value of the RSRQ when the uplink channel and/or the downlink channel of each base station is in a busy state and the value of the RSRQ when the uplink channel and/or the downlink channel of each base station is in an idle state, to a service base station of the terminal.

In the above disclosure, preferably, the processor is further configured to perform the following operations:

calculating a busy/idle ratio of the uplink channel and/or the downlink channel of each base station, and reporting, by the output device, the busy/idle ratio of the uplink channel and/or the downlink channel of each base station to the service base station.

In the above disclosure, preferably, the processor is further configured to perform the following operations:

measuring a value of RSRP corresponding to each base station, when the uplink channel and/or the downlink channel of each base station is in a busy state and/or in an idle state;

reporting to the service base station, by the output device, the value of the RSRP corresponding to each base station.

In the above disclosure, preferably, the processor determining the busy/idle states of the uplink channel and/or the downlink channel of each base station according to the downlink signal includes:

detecting a period of sending a reference signal by each base station;

determining that the uplink channel and/or the downlink channel of any base station is in a busy state, when the period of sending the reference signal by any base station in the at least one base station is greater than or equal to a predetermined period; and determining that the uplink channel and/or the downlink channel of any base station is in an idle state, when the period of sending the reference signal by any base station in the at least one base station is less than the predetermined period.

In the above disclosure, preferably, the processor determining the busy/idle state of the uplink channel and/or the downlink channel of each base station according to the downlink signal includes:

determining that the uplink channel and/or the downlink channel of any base station is in an idle state, when a resource reservation signal sent by any base station in the at least one base station or a signal indicating that the uplink channel and/or the downlink channel of any base station is in an idle state is received.

In the above disclosure, preferably, the processor determining the busy/idle state of the uplink channel and/or the downlink channel of each base station according to the downlink signal includes:

determining that the uplink channel and/or the downlink channel of each base station is in a busy state, when receiving an instruction indicating that the micro cell base station is closed by any base station in the at least one base station.

According to a fifth aspect of the present disclosure, an RRM measurement system of an LTE system working in the unlicensed frequency band is provided. The RRM measurement method is applicable to a base station, and includes: a receiving unit, which is configured to receive a value of RSRQ corresponding to each base station in at least one base station, obtained when an uplink channel and/or a downlink channel of each base station is in a busy state, and a value of the RSRQ corresponding to each base station in at least one base station, obtained when the uplink channel and/or the downlink channel of each base station is in an idle state, reported by a terminal; a determination unit, which is configured to determining a service performance of each base station according to the value of the RSRQ obtained when uplink channel and/or downlink channel of each base station is in a busy state and the value of the RSRQ obtained when uplink channel and/or downlink channel of each base station is in an idle state.

In the above disclosure, surrounding interference signal needs to be considered when determining the RSRQ. Therefore, a service performance of each base station can be determined accurately (by the service base station of the terminal), according to the values of the RSRQ corresponding to each base station in at least one base station when the uplink channel and/or the downlink channel of each base station is in a busy state and in an idle state reported by the terminal. Thus, the service base station can be ensured to select a more appropriate secondary cell base station or select a more appropriate target base station when switching.

In the above disclosure, preferably, the receiving unit is further configured to receive a busy/idle ratio of the uplink channel and/or the downlink channel of each base station reported by the terminal, and/or a busy/idle ratio of the uplink channel and/or the downlink channel of other base stations reported by the other base stations; the determination unit is further configured to determine a service performance of each base station and/or the other base station, according to the busy/idle ratio of the uplink channel and/or the downlink channel of each base station and/or the busy/idle ratio of the uplink channel and/or the downlink channel of the other base stations.

In the above disclosure, by receiving the busy/idle ratio of the uplink channel and/or the downlink channel of each base station reported by the terminal, the service base station can determine the service performance of each base station according to the busy/idle ratio of the uplink channel and/or the downlink channel of each base station. The service base station, thus, can select a more appropriate secondary cell base station or select a more appropriate target base station when switching.

The above disclosure, preferably, further includes a judging unit, which is configured to determine whether there is a need to switch to a target base station to provide service to the terminal according to the service performance of the target base station; a first selection unit, which is configured to select the target base station according to service performance of the at least one base station when it is determined to switch to the target base station to provide service to the terminal; and/or a second selecting unit, which is configured to select the target base station serving as an auxiliary cell base station according to the service performance of the at least one base station.

In the above disclosure, preferably, the first selection unit and/or the second selection unit is specifically configured to: select the base station which has the maximum RSRQ obtained when the uplink channel and/or the downlink channel is in a busy state as the target base station; and/or select the base station which has the maximum RSRQ value obtained when the uplink channel and/or the downlink channel is in an idle state as the target base station, and/or select the base station which has the maximum busy/idle ratio of the uplink channel and/or the downlink channel as the target base station.

The above disclosure, preferably, further includes: a notification unit, which is configured to indicate that the terminal to measure the RSRQ at a designated time-frequency location.

According to a sixth aspect of the present disclosure, a base station is provided. The base station includes a communication bus, an input device, a memory and a processor, wherein:

the communication bus is used for realizing connection communication between the input device, the memory and the processor;

the input device is used for receiving a value of RSRQ corresponding to each base station in at least one base station, obtained when an uplink channel and/or a downlink channel of each base station is in a busy state, and a value of the RSRQ corresponding to each base station in at least one base station, obtained when the uplink channel and/or the downlink channel of each base station is in an idle state, reported by a terminal.

the memory stores a set of program codes, and the processor retrieves the program codes stored in the memory and executes the following operations:

receiving from a terminal, by the input device, a value of the RSRQ corresponding to each base station in at least one base station, obtained when the uplink channel and/or the downlink channel of each base station is in a busy state, and a value of the RSRQ corresponding to each base station in at least one base station, obtained when the uplink channel and/or the downlink channel of each base station is in an idle state; and determining a service performance of each base station according to the value of the RSRQ obtained when the uplink channel and/or the downlink channel of each base station is in a busy state and the value of the RSRQ obtained when the uplink channel and/or the downlink channel of each base station is in an idle state.

In the above disclosure, preferably, the processor is further configured to perform the following operations:

receiving, by the input device, a busy/idle ratio of the uplink channel and/or the downlink channel of each base station reported by the terminal, and/or a busy/idle ratio of the uplink channel and/or the downlink channel of other base stations reported by the other base stations; and determining a service performance of each base station and/or the other base station, according to the busy/idle ratio of the uplink channel and/or the downlink channel of each base station and/or the busy/idle ratio of the uplink channel and/or the downlink channel of the other base stations.

In the above disclosure, preferably, the processor is further configured to perform the following operations:

determining whether there is a need to switch to a target base station to provide services to the terminal according to the service performance of the target base station, selecting the target base station according to the service performance of the at least one base station when it is determined to switch to the target base station to provide service to the terminal; and/or selecting the target base station serving as an auxiliary cell base station according to the service performance of the at least one base station.

In the above disclosure, preferably, the processor selecting the target base station specifically includes any one or more of the following combinations:

selecting the base station which has the maximum RSRQ obtained when the uplink channel and/or the downlink channel is in a busy state as the target base station; selecting the base station which has the maximum RSRQ obtained when the uplink channel and/or the downlink channel is in an idle state as the target base station, and selecting the base station which has the maximum busy/idle ratio of the uplink channel and/or the downlink channel as the target base station.

In the above disclosure, preferably, the processor is further configured to perform the following operations:

indicating the terminal to measure the RSRQ at a designated time-frequency location.

Through the above disclosures, the RSRP can be measured respectively based on the channel states of the base station, thus, the service base station of the terminal can accurately determine the service performance of the adjacent base station, to select a more suitable secondary cell base station or select a more suitable target base station when switching.

DETAILED DESCRIPTION

In order to better understand the above objectives, features, and advantages, the present disclosures will be further described in detail in the following with reference to the accompanying drawings and the detailed description. It should be noted that, in the case of no conflict, the embodiments of the application and the features in the embodiments can be combined with each other.

In the following description, numerous specific details are set forth in order to provide a thorough understanding of the present disclosure, however, the present disclosure may also be implemented in ways other than those described herein. Accordingly, the scope of the present disclosure is not limited by the specific embodiments disclosed below.

Figure 1:
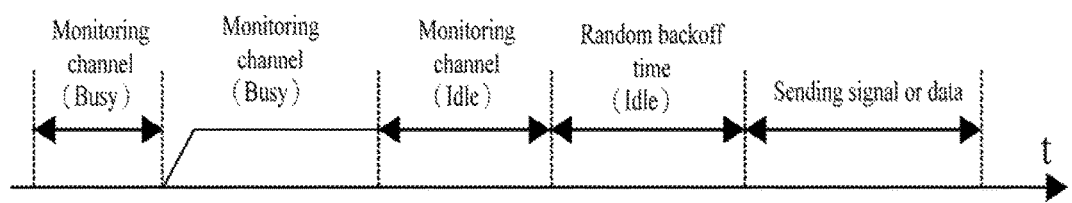
FIG. 1 shows a schematic diagram of interference avoidance rules of a WI-FI system.
Figure 2:
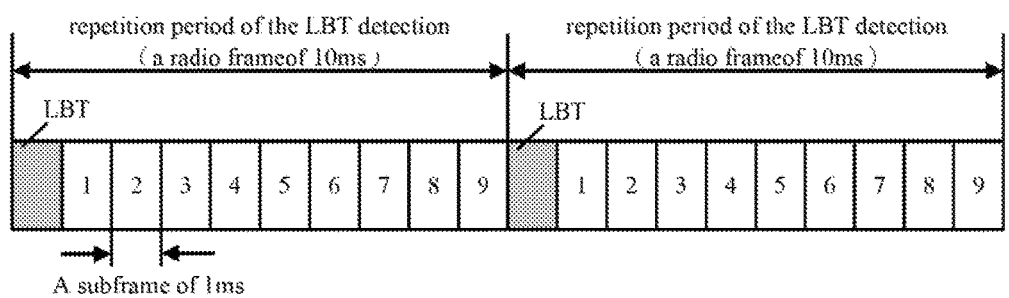
FIG. 2 shows a schematic diagram of a channel detection mechanism when an LTE system works in an unlicensed frequency band.
Figure 3:
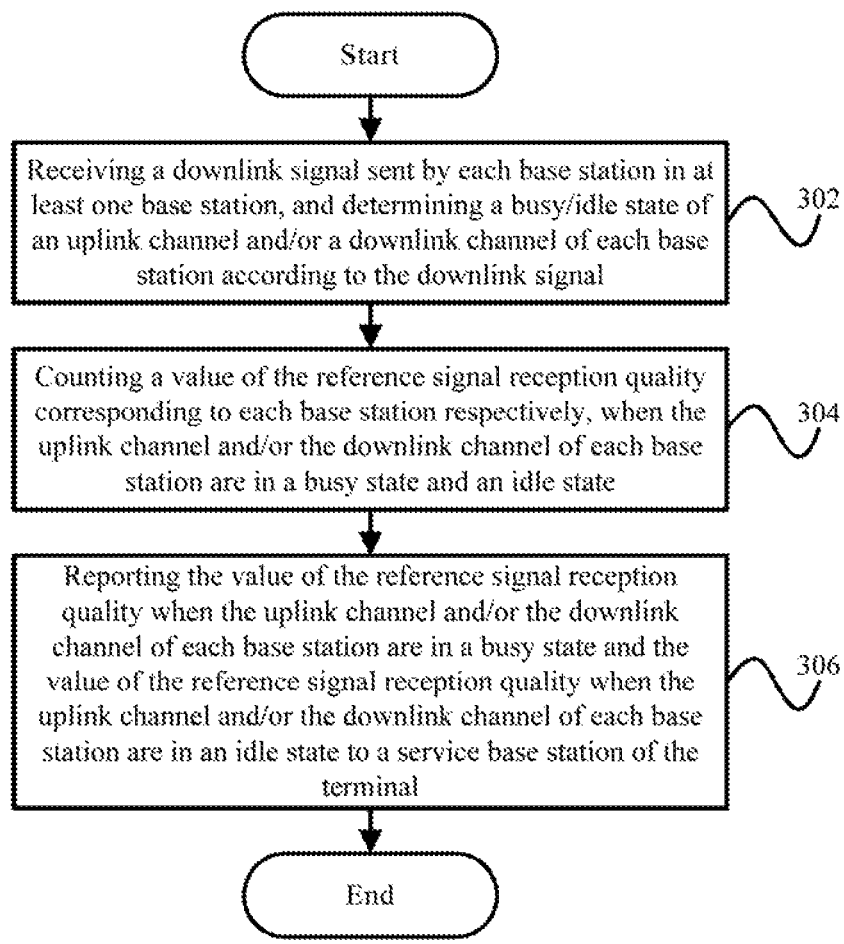
FIG. 3 illustrates a schematic flow diagram of an RRM measurement method of an LTE system applicable to a terminal when working in an unlicensed frequency band according to an embodiment of the present disclosure.

FIG. 3 illustrates a schematic flow diagram of an RRM measurement method of an LTE system applicable to a terminal when working in an unlicensed frequency band according to an embodiment of the present disclosure.

As shown in FIG. 3, according to one embodiment of the present disclosure, the RRM measurement method of an LTE system applicable to a terminal when working in an unlicensed frequency band includes: step 302, receiving a downlink signal sent by each base station in at least one base station, and determining a busy/idle state of an uplink channel and/or a downlink channel of each base station according to the downlink signal; step 304, calculating a value of RSRQ corresponding to each base station respectively, when the uplink channel and/or the downlink channel of each base station is in a busy state and in an idle state; step 306, reporting the value of the RSRQ when the uplink channel and/or the downlink channel of each base station is in a busy state and the value of the RSRQ when the uplink channel and/or the downlink channel of each base station is in an idle state, to a service base station of the terminal.

In the above disclosure, surrounding interference signal needs to be considered when determining the RSRQ. Thus, the busy/idle state of the uplink channel and/or the downlink channel of each base station is determined according to the downlink signals sent by each base station, so as to calculate the value of the RSRQ in the uplink channel and/or the downlink channel of each base station in the busy state and the value of the RSRQ in the uplink channel and/or the downlink channel of each base station in the idle state respectively. Thus, the values of the RSRQ in the uplink channel and/or the downlink channel of the base station can be measured respectively when the uplink channel and/or the downlink channel of the base station are in different states. That is, the values of the RSRQ can be measured respectively when the surrounding interference is weak (the channel is idle) and when the surrounding interference is strong (the channel is busy). Thus, the service base station can be ensured to select a more appropriate secondary cell base station or select a more appropriate target base station when switching.

The above disclosure, preferably, further includes: calculating a busy/idle ratio of the uplink channel and/or the downlink channel of each base station, and reporting the busy/idle ratio of the uplink channel and/or the downlink channel of each base station to the service base station.

In the above disclosure, the busy/idle ratio of the uplink channel and/or the downlink channel of each base station is reported to the service base station, so that the service base station can determine a service performance of each base station according to the busy/idle ratio of the uplink channel and/or the downlink channel of each base station; and the service base station can determine the service performance of each base station according to the busy/idle ratio of the uplink channel and/or the downlink channel of each base station. A more suitable secondary cell base station can be selected or a more appropriate target base station can be selected when switching.

The above disclosure, preferably, further includes: measuring a value of RSRP corresponding to each base station, when the uplink channel and/or the downlink channel of each base station is in a busy state and/or in an idle state; and reporting the value of the RSRP corresponding to each base station to the service base station.

In the above disclosure, since the value of the RSRP is not affected by the surrounding interference signal, the measurement can be performed when the uplink channel and/or the downlink channel is in a busy state, and the measurement may also be performed when the uplink channel and/or the downlink channel is in an idle state.

Schemes of determining the busy/idle state of the uplink channel and/or the downlink channel of the base station by the terminal may include:

Scheme 1 is described below.

In the above disclosure, preferably, determining the busy/idle state of the uplink channel and/or the downlink channel of each base station according to the downlink signal includes: detecting a period of sending a reference signal by each base station; determining that the uplink channel and/or the downlink channel of any base station is in a busy state, when the period of sending the reference signal by any base station in the at least one base station is greater than or equal to a predetermined period; and determining that the uplink channel and/or the downlink channel of any base station is in an idle state, when the period of sending the reference signal by any base station in the at least one base station is less than the predetermined period.

In the above disclosure, the base station may set the period of sending the reference signal after the state of the uplink channel and/or the downlink channel is determined. Specifically, if the uplink channel and/or the downlink channel of the base station is in a busy state, the period of the reference signal is longer; and if the uplink channel and/or the downlink channel of the base station is in an idle state, the period of the reference signal is shorter. Thus, the terminal can determine the busy/idle state of the uplink channel and/or the downlink channel according to the period of sending the reference signal.

Scheme 2 is described below.

In the above disclosure, preferably, determining the busy/idle state of the uplink channel and/or the downlink channel of each base station according to the downlink signal includes: determining that the uplink channel and/or the downlink channel of any base station is in an idle state, when a resource reservation signal sent by any base station in the at least one base station or a signal indicating that the uplink channel and/or the downlink channel of any base station is in an idle state is received.

In the above disclosure, the base station may explicitly notify the terminal as to the state of the uplink and/or downlink channels of the base station.

Scheme 3 is described below.

In the above disclosure, preferably, determining the busy/idle state of the uplink channel and/or the downlink channel of each base station according to the downlink signal includes:

determining that the uplink channel and/or the downlink channel of each base station is in a busy state, when receiving an instruction indicating that the micro cell base station is closed by any base station in the at least one base station. Specifically, if the terminal receives the instruction indicating that the micro cell base station is closed by a base station, the terminal can determine directly that the channel of the base station is in a busy state.

Figure 4:
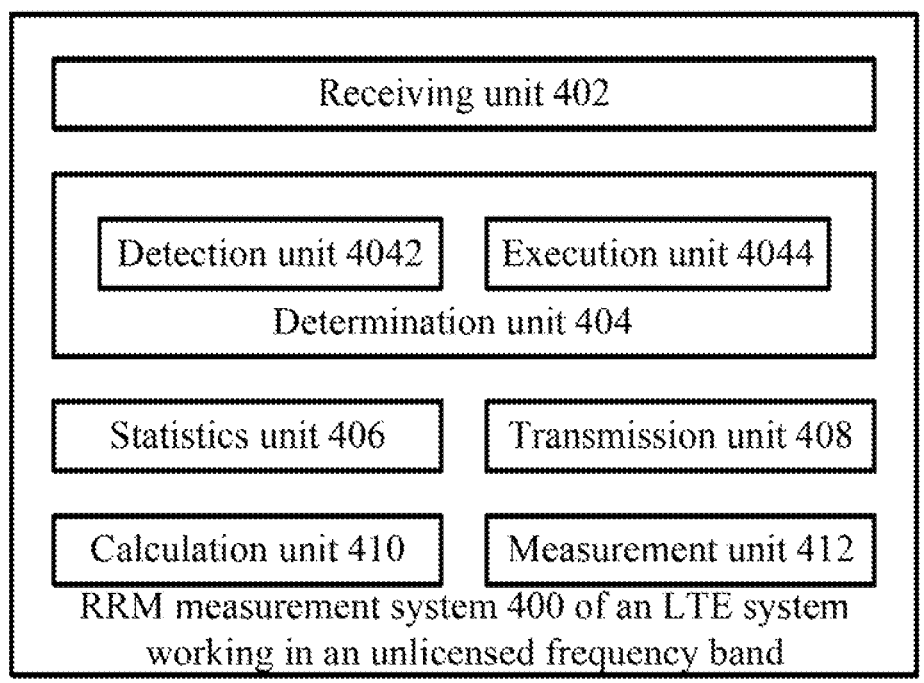
FIG. 4 shows a schematic block diagram of an RRM measurement system of an LTE system applicable to a terminal when working in an unlicensed frequency band according to an embodiment of the present disclosure.

FIG. 4 shows a schematic block diagram of an RRM measurement system of an LTE system applicable to a terminal when working in an unlicensed frequency band according to an embodiment of the present disclosure.

As shown in FIG. 4, according to one embodiment of the present disclosure, the RRM measurement system 400 of an LTE system applicable to a terminal when working in an unlicensed frequency band includes: a receiving unit 402, which is configured to receive a downlink signal sent by each base station in at least one base station; a determination unit 404, which is configured to determine a busy/idle state of an uplink channel and/or a downlink channel of each base station according to the downlink signal; a statistics unit 406, which is configured to calculate a value of RSRQ corresponding to each base station respectively, when the uplink channel and/or the downlink channel of each base station is in a busy state and in an idle state; and a transmission unit 408, which is configured to report the value of the RSRQ when the uplink channel and/or the downlink channel of each base station is in a busy state and the value of the RSRQ when the uplink channel and/or the downlink channel of each base station is in an idle state to a service base station of the terminal.

In the above disclosure, surrounding interference signal needs to be considered when determining the RSRQ. Thus, the busy/idle state of the uplink channel and/or the downlink channel of each base station is determined according to the downlink signals sent by each base station, so as to calculate the value of the RSRQ in the uplink channel and/or the downlink channel of each base station in the busy state and the value of the RSRQ in the uplink channel and/or the downlink channel of each base station in the idle state respectively. Thus, the values of the RSRQ in the uplink channel and/or the downlink channel of the base station can be measured respectively when the uplink channel and/or the downlink channel of the base station are in different states. That is, the values of the RSRQ can be measured respectively when the surrounding interference is weak (the channel is idle) and when the surrounding interference is strong (the channel is busy). Thus, the service base station can be ensured to select a more appropriate secondary cell base station or select a more appropriate target base station when switching.

The above disclosure, preferably, further includes: a calculation unit 410, which is configured to calculate a busy/idle ratio of the uplink channel and/or the downlink channel of each base station; and the transmission unit 408 is further configured to report the busy/idle ratio of the uplink channel and/or the downlink channel of each base station to the service base station.

In the above disclosure, the busy/idle ratio of the uplink channel and/or the downlink channel of each base station is reported to the service base station, so that the service base station can determine a service performance of each base station according to the busy/idle ratio of the uplink channel and/or the downlink channel of each base station; and the service base station can determine the service performance of each base station according to the busy/idle ratio of the uplink channel and/or the downlink channel of each base station. A more suitable secondary cell base station can be selected or a more appropriate target base station can be selected when switching.

The above disclosure, preferably, further includes: a measurement unit 412, which is configured to measure a value of RSRP corresponding to each base station, when the uplink channel and/or the downlink channel of each base station is in a busy state and/or in an idle state; and the transmission unit 408 is further configured to report the value of the RSRP corresponding to each base station to the service base station.

In the above disclosure, since the value of the RSRP is not affected by the surrounding interference signal, the measurement can be performed when the uplink channel and/or the downlink channel is in a busy state, and the measurement may also be performed when the uplink channel and/or the downlink channel is in an idle state.

Schemes of determining the busy/idle state of the uplink channel and/or the downlink channel of the base station by the terminal may include:

Scheme 1 is described below.

In the above disclosure, preferably, the determination unit 404 includes: a detection unit 4042 configured to detect a period of sending a reference signal by each base station; an execution unit 4044 configured to determine that the uplink channel and/or the downlink channel of any base station is in a busy state, when the period of sending the reference signal by any base station in the at least one base station is greater than or equal to a predetermined period, and determine that the uplink channel and/or the downlink channel of any base station is in an idle state, when the period of sending the reference signal by any base station in the at least one base station is less than the predetermined period.

In the above disclosure, the base station may set the period of sending the reference signal after the state of the uplink channel and/or the downlink channel is determined. Specifically, if the uplink channel and/or the downlink channel of the base station is in a busy state, the period of the reference signal is longer; and if the uplink channel and/or the downlink channel of the base station is in an idle state, the period of the reference signal is shorter. Thus, the terminal can determine the busy/idle state of the uplink channel and/or the downlink channel according to the period of sending the reference signal.

Scheme 2 is described below.

In the above disclosure, preferably, the determination unit 404 is specifically configured to determine that the uplink channel and/or the downlink channel of any base station is in an idle state, when a resource reservation signal sent by any base station in the at least one base station or a signal indicating that the uplink channel and/or the downlink channel of any base station is in an idle state is received.

In the above disclosure, the base station may explicitly notify the terminal the state of the uplink and/or downlink channels of the base station.

Scheme 3 is described below.

In the above disclosure, preferably, the determination unit 404 is specifically configured to determine that the uplink channel and/or the downlink channel of each base station is in a busy state, when receiving an instruction indicating that the micro cell base station is closed by any base station in the at least one base station. Specifically, if the terminal receives the instruction indicating that the micro cell base station is closed by any base station, the terminal can determine directly that the channels of the base station in a busy state.

The present disclosure provides a terminal (not shown in the figure)) that includes: the RRM measurement system 400 of an LTE system applicable to a terminal when working in an unlicensed frequency band, as shown in FIG. 4.

Figure 5:
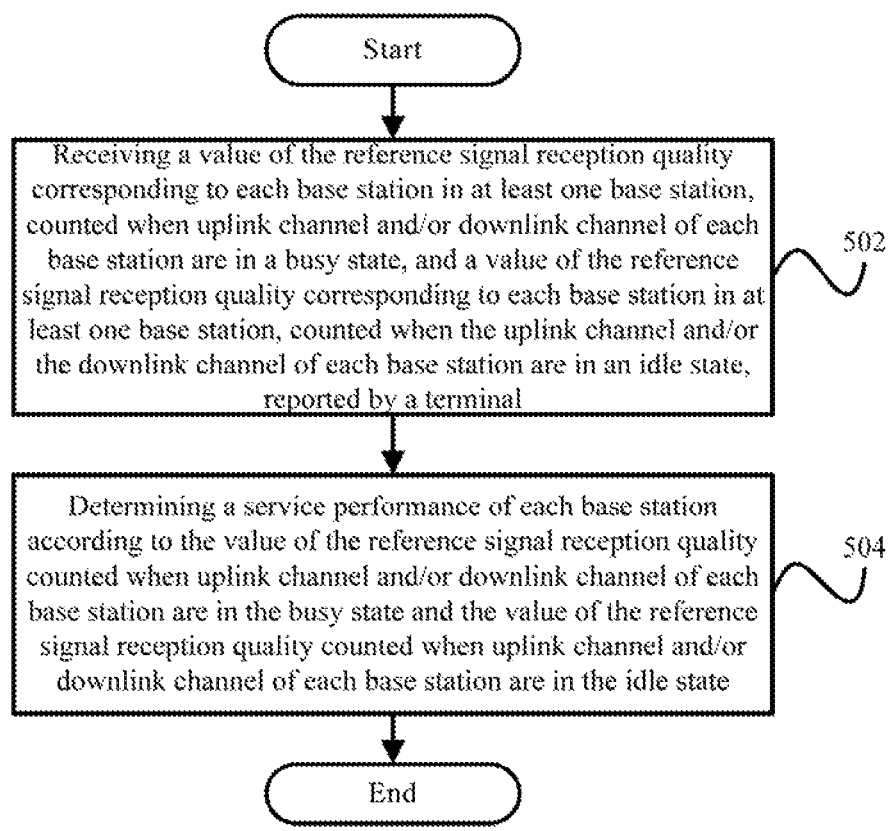
FIG. 5 illustrates a schematic flow diagram of an RRM measurement method of an LTE system applicable to a base station when working in an unlicensed frequency band according to an embodiment of the present disclosure.

FIG. 5 illustrates a schematic flow diagram of an RRM measurement method of an LTE system applicable to a base station when working in an unlicensed frequency band according to an embodiment of the present disclosure.

As shown in FIG. 5, in accordance with one embodiment of the present disclosure, the RRM measurement method of an LTE system applicable to a base station when working in an unlicensed frequency band includes: step 502, receiving a value of RSRQ corresponding to each base station in at least one base station, obtained when an uplink channel and/or a downlink channel of each base station is in a busy state, and a value of the RSRQ corresponding to each base station in at least one base station, obtained when the uplink channel and/or the downlink channel of each base station is in an idle state, reported by a terminal; step 504, determining a service performance of each base station according to the value of the RSRQ obtained when uplink channel and/or downlink channel of each base station is in a busy state and the value of the RSRQ obtained when the uplink channel and/or the downlink channel of each base station is in an idle state.

In the above disclosure, surrounding interference signal needs to be considered when determining the RSRQ. Therefore, a service performance of each base station can be determined accurately (by the service base station of the terminal), according to the values of the RSRQ corresponding to each base station in at least one base station when the uplink channel and/or the downlink channel of each base station is in a busy state and in an idle state reported by the terminal. Thus, the service base station can be ensured to select a more appropriate secondary cell base station or select a more appropriate target base station when switching.

The above disclosure, preferably, further includes: receiving a busy/idle ratio of the uplink channel and/or the downlink channel of each base station reported by the terminal, and/or a busy/idle ratio of the uplink channel and/or the downlink channel of other base stations reported by the other base stations; determining a service performance of each base station and/or the other base station, according to the busy/idle ratio of the uplink channel and/or the downlink channel of each base station and/or the busy/idle ratio of the uplink channel and/or the downlink channel of the other base stations.

In the above disclosure, by receiving the busy/idle ratio of the uplink channel and/or the downlink channel of each base station reported by the terminal, the service base station can determine the service performance of each base station according to the busy/idle ratio of the uplink channel and/or the downlink channel of each base station. The service base station, thus, can select a more appropriate secondary cell base station or select a more appropriate target base station when switching.

The above disclosure, preferably, further includes: determining whether there is a need to switch to a target base station to provide services to the terminal according to the service performance of the target base station, selecting the target base station according to the service performance of the at least one base station when it is determined to switch to the target base station to provide services to the terminal; and/or selecting the target base station serving as an auxiliary cell base station according to the service performance of the at least one base station.

In the above disclosure, preferably, selecting the target base station includes any one or more of the following combinations: selecting the base station which has the maximum RSRQ obtained when the uplink channel and/or the downlink channel is in a busy state as the target base station; selecting the base station which has the maximum RSRQ value obtained when the uplink channel and/or the downlink channel is in an idle state as the target base station, and selecting the base station which has the maximum busy/idle ratio of the uplink channel and/or the downlink channel as the target base station.

The above disclosure, preferably, further includes: indicating the terminal to measure the RSRQ at a designated time-frequency location.

Figure 6:
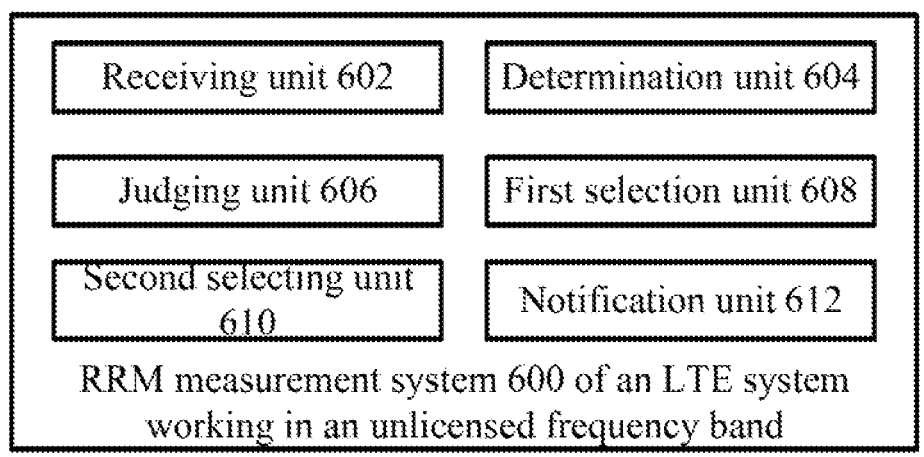
FIG. 6 shows a schematic block diagram of an RRM measurement system of an LTE system applicable to a base station when working in an unlicensed frequency band according to an embodiment of the present disclosure.

FIG. 6 shows a schematic block diagram of an RRM measurement system of an LTE system applicable to a base station when working in an unlicensed frequency band according to an embodiment of the present disclosure.

As shown in FIG. 6, in accordance with one embodiment of the present disclosure, the RRM measurement system 600 of an LTE system applicable to a base station when working in an unlicensed frequency band includes: a receiving unit 602, which is configured to receive a value of RSRQ corresponding to each base station in at least one base station, obtained when an uplink channel and/or a downlink channel of each base station is in a busy state, and a value of the RSRQ corresponding to each base station in at least one base station, obtained when the uplink channel and/or the downlink channel of each base station is in an idle state, reported by a terminal; a determination unit 604, which is configured to determining a service performance of each base station according to the value of the RSRQ obtained when uplink channel and/or downlink channel of each base station is in a busy state and the value of the RSRQ obtained when uplink channel and/or downlink channel of each base station is in an idle state.

In the above disclosure, surrounding interference signal needs to be considered when determining the RSRQ. Therefore, a service performance of each base station can be determined accurately (by the service base station of the terminal), according to the values of the RSRQ corresponding to each base station in at least one base station when the uplink channel and/or the downlink channel of each base station is in a busy state and in an idle state reported by the terminal. Thus, the service base station can be ensured to select a more appropriate secondary cell base station or select a more appropriate target base station when switching.

In the above disclosure, preferably, the receiving unit 602 is further configured to receive a busy/idle ratio of the uplink channel and/or the downlink channel of each base station reported by the terminal, and/or a busy/idle ratio of the uplink channel and/or the downlink channel of other base stations reported by the other base stations; the determination unit 604 is further configured to determine a service performance of each base station and/or the other base station, according to the busy/idle ratio of the uplink channel and/or the downlink channel of each base station and/or the busy/idle ratio of the uplink channel and/or the downlink channel of the other base stations.

In the above disclosure, by receiving the busy/idle ratio of the uplink channel and/or the downlink channel of each base station reported by the terminal, the service base station can determine the service performance of each base station according to the busy/idle ratio of the uplink channel and/or the downlink channel of each base station. The service base station, thus, can select a more appropriate secondary cell base station or select a more appropriate target base station when switching.

The above disclosure, preferably, further includes a judging unit 606, which is configured to determine whether there is a need to switch to a target base station to provide service to the terminal according to the service performance of the target base station; a first selection unit 608, which is configured to select the target base station according to service performance of the at least one base station when it is determined by the judging unit 606 to switch to the target base station to provide service to the terminal; and/or a second selecting unit 610, which is configured to select the target base station serving as an auxiliary cell base station according to the service performance of the at least one base station.

In the above disclosure, preferably, the first selection unit 608 and/or the second selection unit 610 is specifically configured to: select the base station which has the maximum RSRQ obtained when the uplink channel and/or the downlink channel is in a busy state as the target base station; and/or select the base station which has the maximum RSRQ value obtained when the uplink channel and/or the downlink channel is in an idle state as the target base station, and/or select the base station which has the maximum busy/idle ratio of the uplink channel and/or the downlink channel as the target base station.

The above disclosure, preferably, further includes: a notification unit 612, which is configured to indicate that the terminal to measure the RSRQ at a designated time-frequency location.

The present disclosure further provides a base station (not shown in the figure). The base station includes the RRM measurement system 600 of an LTE system when working in an unlicensed frequency band as shown in FIG. 6.

The present disclosure mainly aims to resolve the problem of RRM measurement after an LTE system introduces an LBT mechanism in an unlicensed frequency band. Methods of measuring RSRP and RSRQ in the downlink subframe of the non-LBT, and the RSRQ obtain measurement statistical average values separately according to the LBT detection result are provided.

Since the base station does not send any signal in the downlink LBT detection time, the measurements of the RSRP and the RSRQ cannot be performed in the LBT detection time. Then, the measurements of the RSRP and the RSRQ should be performed in the downlink subframe of the non-LBT detection subframe. The base station may instruct the terminal to measure RSRP and RSRQ at a specified time-frequency location.

The RSRP is not influenced by the LBT detection result because the detection result of the LBT is determined mainly according to the ambient interference. Thus, the statistical average values are not required to be measured separately according to the results of detection. However, the RSRQ is concerned in the ambient interference, and if not measured separately, following problem may occur.

For example: a measurement period of the RSRQ is 200 ms, and a value is measured every 10 ms. Thus, 20 measurement values can be obtained in one measurement period. If the LBT detection is performed every 10 ms, 20 LBT detection results can be obtained in the measurement period of the RSRQ.

In the measurement result of cell #1, 15 LBT detection results are busy. The corresponding RSRQ value is 0.1*Q, 5 detection results show idle, and the corresponding RSRQ value is 0.9*Q. In the measurement result of cell #2, 10 LBT detection results show busy, and the corresponding RSRQ value is 0.2*Q. 10 LBT detection results show idle, and the corresponding RSRQ value is 0.6*Q. The results are shown in table 1.

TABLE 1

|  | RSRQ when LBT detection results are busy | RSRQ when LBT detection results are idle | Total RSRQ |
| --- | --- | --- | --- |
| Cell#1 | 0.9 | 0.1 | 0.3 |
| Cell#2 | 0.6 | 0.2 | 0.4 |

In the cases shown in the table 1, if the total RSRQ is considered, the performance of the cell #2 is better. However if the RSRQ in an idle state is considered, the performance of cell #1 is better. In fact, when the channel is busy, user equipment cannot interact with the base station at all. The user equipment can interact with the base station only when the channel is idle. Then, it is necessary to measure and report the RSRQ separately when the channel is busy and idle.

Therefore, the present disclosure provides a mechanism to measure and report separate RSRQs based on the channel being busy and being idle. The specific method is as follows:

1. Sampling the RSRQ measurement result in the busy time of the channel into a first group, and sampling the RSRQ measurement result in the idle time of the channel into a second group;

2. The two groups of results are taken as the average of the layer 1;

3. The two groups of results are taken as the average of the layer 3;

4. The two groups of results are reported separately to the base station.

The RSRQ value is distinguished mainly according to the busy/idle state of a downlink channel due to the fact that the terminal selects the base station. Certainly, the RSRQ value can be distinguished according to the busy/idle state of the uplink channel, or according to the busy/idle state of the uplink channel and the downlink channel. The description below takes distinguishing the RSRQ values of the busy/idle state of the downlink channel as an example.

Since the busy/idle state of the downlink channel is detected by an LBT of the base station, in order to enable the user equipment to know whether the LBT detection period channel is busy or idle, the present disclosure provides the following process.

1. determining according to a period of the base station sending the reference signal. Specifically, if the channel is busy, the period of sending the reference signals, such as the PSS/SSS, CRS, CSI-RS is long. If the channel is idle, the period of sending the reference signal is short. In this way, the user equipment can detect whether the channel in the LBT detection period is busy or idle according to the period of sending the reference signal by the base station.

2. determining according to a special signal sent by the base station. Specifically, if detecting that the channel is idle in the LBT detection, the base station sends a channel idle identifier or a resource reservation signal. The user equipment determines whether the channel in the LBT detection period is busy or idle according to the detected channel idle identification or the resource reservation signal. The channel idle identification can be sent immediately after the LBT detection is completed. Thus, to conserve energy, the terminal does not detect the PDCCH in the period after the channel is found busy.

3. determining according to whether the base station sending a small cell/off instruction. Specifically, the base station sends a small cell off instruction by MAC signaling, physical layer signaling, Discontinuous reception (DRX), configuration and the like. Similarly, using this method, to conserve energy, the terminal does not detect the PDCCH after the channel is found busy.

When determining the busy/idle state of the channel, the user equipment can take the statistical RSRQ value separately according to the busy/idle state of the channel, and report the statistical RSRQ value to the base station. Meanwhile, the user equipment can also calculate the busy/idle ratio of the channel after determining the busy/idle state of the channel, and report the idle ratio of the channel to the base station.

The user equipment can distinguish the statistical RSRQ value according to the busy/idle state of the channel in the service base station and/or the neighboring base station, and report to the service base station. The neighboring base station can also calculate the busy/idle ratio of the channel itself, and inform the service base station through the interface between the base stations.

When there is a needed to switch from the service base station to the target base station to provide service for the terminal, or when the service base station is to select the most appropriate Scell (secondary cell base station), the target cell or the most suitable Scell can be selected according to the statistical RSRQ value. This RSRQ value is calculated according to the busy/idle states reported by the user equipment, and the busy/idle ratio of the channel. During selection, the following criteria can be adopted: selecting a cell with the largest RSRQ in the idle time; selecting a cell with the largest idle ratio of the channel; and selecting a cell with the largest RSRQ in the busy time.

According to the embodiments of the present disclosure, the RRM can be measured after introducing the LBT mechanism when the LTE system is used in the unlicensed frequency band. Thus, the user equipment separately samples, averages, and reports the RSRQs when the channel is busy and when the channel is idle. It is ensured that when selecting the target base station or adding a Scell, the service base station can select the most appropriate target cell or a target Scell according to the RSRQ values in the busy time and in the idle time. This can be combined with the idle ratio of the channel in each candidate cell. The system throughput is improved, and the user equipment switching interruption probability is reduced.

Figure 7:
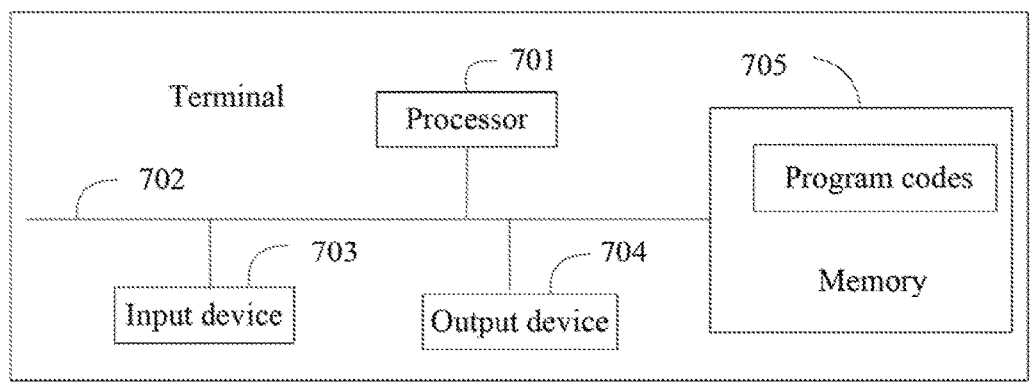
FIG. 7 shows a structure diagram of a terminal according to an embodiment of the present disclosure.

An embodiment of the present disclosure further provides a terminal. FIG. 7 shows a diagram of the structure of the terminal according to an embodiment of the present disclosure. As shown, the terminal may include: at least one input device 703, at least one output device 704, at least one processor 701, e.g., a CPU, a memory 705, and at least one communication bus 702. The processor 701 can be combined with the RRM measurement system of the LTE system working in the unlicensed frequency band, as shown in FIG. 4.

The communication bus 702 is used to connect the input device 703, the output device 704, the processor 701, and the memory 705.

The input device 703 may specifically be a communication interface of the terminal, such as a network interface. The network interface may include a standard wired interface or a wireless interface (such as a WI-FI interface), and is specifically configured to receive a downlink signal.

The output device 704 may be a communication interface of the terminal, such as a network interface. The network interface may include a standard wired interface or a wireless interface (such as a WI-FI interface) that is specifically used to report the value of the RSRQ obtained when the uplink channel and/or the downlink channel of each base station are in a busy state and the value of the RSRQ obtained when the uplink channel and/or the downlink channel of each base station are in an idle state.

The memory 705 may be a high-speed RAM memory or a non-volatile memory, such as a magnetic disk memory. The memory 705 is further configured to store a set of program codes. The processor 701 is used for retrieving the program codes stored in the memory 705, and executing the following operations:

receiving, by the input device 703, a downlink signal sent by each base station in at least one base station, and determining busy/idle states of an uplink channel and/or a downlink channel of each base station according to the downlink signal;

calculating a value of RSRQ corresponding to each base station respectively, when the uplink channel and/or the downlink channel of each base station is in a busy state and in an idle state;

reporting, by the output device 704, the value of the RSRQ when the uplink channel and/or the downlink channel of each base station is in a busy state and the value of the RSRQ when the uplink channel and/or the downlink channel of each base station is in an idle state, to a service base station of the terminal.

In an alternative embodiment, the processor 701 is further configured to perform the following operations:

calculating a busy/idle ratio of the uplink channel and/or the downlink channel of each base station, and reporting, by the output device 704, the busy/idle ratio of the uplink channel and/or the downlink channel of each base station to the service base station.

In an alternative embodiment, the processor 701 is further configured to perform the following operations:

measuring a value of RSRP corresponding to each base station, when the uplink channel and/or the downlink channel of each base station is in a busy state and/or in an idle state;

reporting to the service base station, by the output device 704, the value of the RSRP corresponding to each base station.

In an alternative embodiment, the processor 701 determining the busy/idle states of the uplink channel and/or the downlink channel of each base station according to the downlink signal specifically includes:

detecting a period of sending a reference signal by each base station;

determining that the uplink channel and/or the downlink channel of any base station is in a busy state, when the period of sending the reference signal by any base station in the at least one base station is greater than or equal to a predetermined period; and determining that the uplink channel and/or the downlink channel of any base station is in an idle state, when the period of sending the reference signal by any base station in the at least one base station is less than the predetermined period.

In an alternative embodiment, the processor 701 determining the busy/idle state of the uplink channel and/or the downlink channel of each base station according to the downlink signal specifically includes:

determining that the uplink channel and/or the downlink channel of any base station is in an idle state, when a resource reservation signal sent by any base station in the at least one base station or a signal indicating that the uplink channel and/or the downlink channel of any base station is in an idle state is received.

In an alternative embodiment, the processor 701 determining the busy/idle state of the uplink channel and/or the downlink channel of each base station according to the downlink signal specifically includes:

determining that the uplink channel and/or the downlink channel of each base station is in a busy state, when receiving an instruction indicating that the micro cell base station is closed by any base station in the at least one base station.

Specifically, the terminal described in the embodiments of the present disclosure may be used to implement some or all of the processes in the method embodiments as described in FIG. 3.

Figure 8:
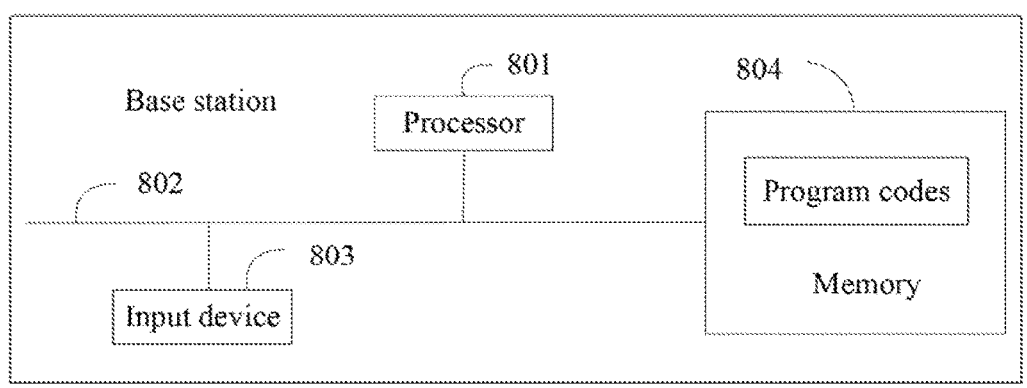
FIG. 8 is a schematic structural diagram of a base station according to an embodiment of the present disclosure.

An embodiment of the present disclosure further provides a base station. FIG. 8 shows a diagram of the structure of the base station according to an embodiment of the present disclosure. As shown, the base station may include at least one input device 803, at least one processor 801, such as a CPU, memory 804, and at least one communication bus 802. The processor 801 can be combined with the RRM measurement system of the LTE system shown in the unlicensed frequency band in FIG. 6.

The communication bus 802 is used to connect the input device 803, the processor 801, and the memory 804.

The input device 803 may be a communication interface of the base station, such as a network interface. The network interface may include a standard wired interface or a wireless interface (such as a WI-FI interface) for receiving from a terminal a value of the RSRQ corresponding to each base station in at least one base station, obtained when uplink channel and/or downlink channel of each base station is in a busy state, and a value of the RSRQ corresponding to each base station in at least one base station, obtained when the uplink channel and/or the downlink channel of each base station is in an idle state, reported by a terminal.

The memory 804 may be a high-speed RAM memory or a non-volatile memory, such as a magnetic disk memory. The memory 804 is further used to store a set of program codes. The processor 801 is used to retrieve the program codes stored in the memory 804, and execute the following operations:

receiving from a terminal, by the input device 803, a value of the RSRQ corresponding to each base station in at least one base station, obtained when the uplink channel and/or the downlink channel of each base station is in a busy state, and a value of the RSRQ corresponding to each base station in at least one base station, obtained when the uplink channel and/or the downlink channel of each base station is in an idle state; and determining a service performance of each base station according to the value of the RSRQ obtained when the uplink channel and/or the downlink channel of each base station is in a busy state and the value of the RSRQ obtained when the uplink channel and/or the downlink channel of each base station is in an idle state.

In an alternative embodiment, the processor 801 is further used to perform the following operations:

receiving, by the input device 803 a busy/idle ratio of the uplink channel and/or the downlink channel of each base station reported by the terminal, and/or a busy/idle ratio of the uplink channel and/or the downlink channel of other base stations reported by the other base stations; and determining a service performance of each base station and/or the other base station, according to the busy/idle ratio of the uplink channel and/or the downlink channel of each base station and/or the busy/idle ratio of the uplink channel and/or the downlink channel of the other base stations.

In an alternative embodiment, the processor 801 is further configured to perform the following operations:

determining whether there is a need to switch to a target base station to provide services to the terminal according to the service performance of the target base station, selecting the target base station according to the service performance of the at least one base station when it is determined to switch to the target base station to provide service to the terminal; and/or selecting the target base station serving as an auxiliary cell base station according to the service performance of the at least one base station.

Further, the processor 801 selecting the target base station specifically includes any one or more of the following combinations:

selecting the base station which has the maximum RSRQ obtained when the uplink channel and/or the downlink channel is in a busy state as the target base station; selecting the base station which has the maximum RSRQ obtained when the uplink channel and/or the downlink channel is in an idle state as the target base station, and selecting the base station which has the maximum busy/idle ratio of the uplink channel and/or the downlink channel as the target base station.

Further, the processor 801 is further configured to perform the following operations:

indicating the terminal to measure the RSRQ at a designated time-frequency location.

Specifically, the base station described in the embodiments of the present disclosure may be used to implement some or all of the processes described in the method embodiments of FIG. 5.

The above embodiments of the present disclosure is described above in detail with reference to the accompanying drawings. The present disclosure provides a novel RRM measurement scheme of an LTE system in an unlicensed frequency band. The reference signal reception power can be measured respectively based on the channel state of the base station. Thus, the service base station of the terminal can accurately determine the service performance of the adjacent base station, to select a more suitable secondary cell base station or select a more suitable target base station when switching.

The above descriptions are only preferred embodiments of the present disclosure, and are not used to limit the present disclosure. It will be apparent to those skilled in the art that various modifications and variations can be made in the present disclosure. Any modification or modification made without departing from the spirit and principle of the present disclosure can be made without departing from the spirit and principle of the present disclosure.

What is claimed is:

1. A computer-implemented Radio Resource Management (RRM) measurement method of Long Term Evolution (LTE) system working in an unlicensed frequency band, the RRM measurement method being applicable to a terminal, and comprising:
receiving a downlink signal sent by each base station in at least one base station, and determining a busy/idle state of an uplink channel and a downlink channel of each base station according to the downlink signal;
calculating a value of a reference signal reception quality corresponding to each base station when the uplink channel and the downlink channel of each base station is in a busy state, and calculating a value of the reference signal reception quality corresponding to each base station when the uplink channel and the downlink channel of each base station is in an idle state;
reporting to a service base station of the terminal, the value of the reference signal reception quality when the uplink channel and the downlink channel of each base station is in a busy state and the value of the reference signal reception quality when the uplink channel or the downlink channel of each base station is in an idle state;
measuring a value of a reference signal reception power corresponding to each base station when the uplink channel and the downlink channel of each base station is in a busy state, and measuring a value of the reference signal reception power corresponding to each base station when the uplink channel and the downlink channel of each base station is in an idle state; and
reporting the value of the reference signal reception power corresponding to each base station when the uplink channel and the downlink channel of each base station is in a busy state and the value of the reference signal reception power corresponding to each base station when the uplink channel and the downlink channel of each base station is in an idle state to the service base station.

2. The RRM measurement method of an LTE system working in an unlicensed frequency band according to claim 1, further comprising:
calculating a busy/idle ratio of the uplink channel and the downlink channel of each base station, and reporting the busy/idle ratio of the uplink channel and the downlink channel of each base station to the service base station.

3. The RRM measurement method of an LTE system working in an unlicensed frequency band according to claim 1, wherein determining the busy/idle state of the uplink channel and the downlink channel of each base station according to the downlink signal comprises:
detecting a period of sending a reference signal by each base station;
determining that the uplink channel and the downlink channel of any base station is in a busy state, when the period of sending the reference signal by any base station in the at least one base station is greater than or equal to a predetermined period; and
determining that the uplink channel and the downlink channel of any base station is in an idle state, when the period of sending the reference signal by any base station in the at least one base station is less than the predetermined period.

4. The RRM measurement method of an LTE system working in an unlicensed frequency band according to claim 1, wherein determining the busy/idle state of the uplink channel and the downlink channel of each base station according to the downlink signal comprises:
determining that the uplink channel and the downlink channel of any base station is in an idle state, when a resource reservation signal sent by any base station in the at least one base station or a signal indicating that the uplink channel and the downlink channel of any base station is in an idle state is received.

5. The RRM measurement method of an LTE system working in an unlicensed frequency band according to claim 1, wherein determining the busy/idle state of the uplink channel and the downlink channel of each base station according to the downlink signal comprises:
determining that the uplink channel and the downlink channel of each base station is in a busy state, when receiving an instruction indicating that the micro cell base station is closed by any base station in the at least one base station.

6. The RRM measurement method of an LTE system working in an unlicensed frequency band according to claim 1, further comprising:
determining, by the service base station, a service performance of each base station according to the value of the reference signal reception quality obtained when uplink channel and downlink channel of each base station is in a busy state and the value of the reference signal reception quality obtained when uplink channel and downlink channel of each base station is in an idle state.

7. The RRM measurement method of an LTE system working in an unlicensed frequency band according to claim 6, further comprising:
a target base station to provide services to the terminal according to the service performance of the at least one base station when there is a need to switch to the target base station to provide services to the terminal; and/or
selecting a target base station as an auxiliary cell base station according to the service performance of the at least one base station.

8. The RRM measurement method of an LTE system working in an unlicensed frequency band according to claim 7, wherein the selecting a target base station to provide services to the terminal comprises any one or more of the following combinations:
selecting the base station having the maximum value of the received reference signal reception quality obtained when the uplink channel and the downlink channel is in a busy state as the target base station to provide services to the terminal; selecting the base station having the maximum value of the received reference signal reception quality obtained when the uplink channel and the downlink channel is in an idle state as the target base station to provide services to the terminal; and
selecting the base station with the maximum busy/idle ratio of the uplink channel and the downlink channel as the target base station to provide services to the terminal.

9. A terminal, comprising a communication bus, an input device, an output device, a memory and a processor, wherein:
the communication bus is used for realizing connection communication among the input device, the output device, the memory and the processor;
the memory stores a set of program codes, and the processor retrieves the program codes stored in the memory and executes the following operations:

receiving, by the input device, a downlink signal sent by each base station in at least one base station, and determining a busy/idle state of the uplink channel and the downlink channel of each base station according to the downlink signal;

calculating a value of the reference signal reception quality corresponding to each base station when the uplink channel and the downlink channel of each base station is in a busy state, and calculating a value of the reference signal reception quality corresponding to each base station when the uplink channel and the downlink channel of each base station is in an idle state;

reporting to a service base station of the terminal, by the output device, the value of the reference signal reception quality when the uplink channel and the downlink channel of each base station is in a busy state and the value of the reference signal reception quality when the uplink channel and the downlink channel of each base station is in an idle state;

wherein the determining a busy/idle state of the uplink channel and the downlink channel of each base station according to the downlink signal comprises:

detecting a period of sending a reference signal by each base station;

determining that an uplink channel and a downlink channel of any base station is in a busy state, when the period of sending the reference signal by any base station in the at least one base station is greater than or equal to a predetermined period; and determining that an uplink channel and a downlink channel of any base station is in an idle state, when the period of sending the reference signal by any base station in the at least one base station is less than the predetermined period.

10. The terminal according to claim 9, wherein the processor is further configured to perform the following operations:

calculating a busy/idle ratio of the uplink channel and the downlink channel of each base station, and reporting, by the output device, the busy/idle ratio of the uplink channel and the downlink channel of each base station to the service base station.

11. The terminal according to claim 9, wherein the processor is further configured to perform the following operations:

measuring a value of the reference signal received power corresponding to each base station, when the uplink channel and the downlink channel of each base station is in a busy state and/or an idle state;

reporting to the service base station, by the output device, the value of the reference signal reception power corresponding to each base station.

12. The terminal according to claim 9, wherein the processor determines the busy/idle state of the uplink channel and the downlink channel of each base station according to the downlink signal comprises:

determining that the uplink channel and the downlink channel of any base station is in an idle state, when a resource reservation signal sent by any base station in the at least one base station or a signal indicating that the uplink channel and the downlink channel of any base station is in an idle state is received.

13. The terminal according to claim 9, wherein the processor determines the busy/idle state of the uplink channel and the downlink channel of each base station according to the downlink signal comprises:

determining that the uplink channel and the downlink channel of each base station is in a busy state, when receiving an instruction indicating that the micro cell base station is closed by any base station in the at least one base station.

14. A base station, the base station comprising a communication bus, an input device, a memory and a processor, wherein:

the communication bus is used for realizing connection communication between the input device, the memory and the processor;

the memory stores a set of program codes, and the processor retrieves the program codes stored in the memory and executes the following operations:

receiving, by the input device, a value of a reference signal reception quality corresponding to each base station in at least one base station, obtained when uplink channel and downlink channel of each base station is in a busy state, and a value of the reference signal reception quality corresponding to each base station in the at least one base station, obtained when the uplink channel and the downlink channel of each base station is in an idle state, reported by a terminal;

determining a service performance of each base station according to the value of the reference signal reception quality obtained when the uplink channel and the downlink channel of each base station is in a busy state and the value of the reference signal reception quality obtained when the uplink channel and the downlink channel of each base station is in an idle state;

selecting the target base station to provide services to the terminal according to the service performance of the at least one base station when there is a need to switch to the target base station to provide services to the terminal, comprising any one or more of the following combinations:

selecting the base station with the maximum value of the received reference signal reception quality obtained when the uplink channel and the downlink channel is in a busy state as the target base station to provide service to the terminal;

selecting the base station with the maximum value of the received reference signal reception quality obtained when the uplink channel and the downlink channel is in an idle state as the target base station to provide service to the terminal; and selecting the base station with the maximum busy/idle ratio of the uplink channel and the downlink channel as the target base station to provide services to the terminal.

15. The base station according to claim 14, wherein the processor is further configured to perform the following operations:

receiving, by the input device, a busy/idle ratio of the uplink channel and the downlink channel of each base station reported by the terminal, and/or a busy/idle ratio of the uplink channel and the downlink channel of other base stations reported by the other base stations; and determining the service performance of each base station and/or the other base station, according to busy/idle ratio of the uplink channel and the downlink channel of each base station and/or the busy/idle ratio of the uplink channel and the downlink channel of the other base stations.

16. The base station according to claim 14, wherein the processor is further configured to perform the following operations:

selecting a target base station serving as an auxiliary cell base station according to the service performance of the at least one base station.

17. The base station according to claim 14, wherein the processor is further configured to perform the following operations:

indicating that the terminal measures the reference signal reception quality at a designated time-frequency location.

* * * * *